(12) United States Patent
Morello et al.

(10) Patent No.: US 10,922,418 B2
(45) Date of Patent: Feb. 16, 2021

(54) RUNTIME DETECTION AND MITIGATION OF VULNERABILITIES IN APPLICATION SOFTWARE CONTAINERS

(71) Applicant: Twistlock, Ltd., Herzliya (IL)

(72) Inventors: John Morello, Baton Rouge, LA (US); Dima Stopel, Herzliya (IL); Liron Levin, Herzliya (IL)

(73) Assignee: Twistlock, Ltd., Herzliya (IL)

( * ) Notice: Subject to any disclaimer, the term of this patent is extended or adjusted under 35 U.S.C. 154(b) by 112 days.

(21) Appl. No.: 15/975,383

(22) Filed: May 9, 2018

(65) Prior Publication Data

US 2018/0260574 A1 Sep. 13, 2018

Related U.S. Application Data (63) Continuation-in-part of application No. 15/278,700, filed on Sep. 28, 2016.
(Continued)

(51) Int. Cl.
*G06F 21/57* (2013.01)
*G06F 21/56* (2013.01)
(Continued)

(52) U.S. Cl.
CPC ........ *G06F 21/577* (2013.01); *G06F 9/44505* (2013.01); *G06F 9/45558* (2013.01);
(Continued)

(58) Field of Classification Search
CPC ............. H04L 63/1433; H04L 63/1416; H04L 63/145; G06F 21/577; G06F 21/566
See application file for complete search history.

(56) References Cited

U.S. PATENT DOCUMENTS 6,490,620 B1 12/2002 Ditmer et al.
6,502,102 B1 12/2002 Haswell et al.
(Continued)

OTHER PUBLICATIONS

Linn, et al., "Protecting Against Unexpected System Calls", Department of Computer Science, University of Arizona, Tucson, AZ, 2005, url: https://www.usenix.org/legacy/events/sec05/tech/linn.html, pp. 239-254.
(Continued)

*Primary Examiner* — Ali S Abyaneh
(74) *Attorney, Agent, or Firm* — M&B IP Analysts, LLC (57) ABSTRACT

A system and method for runtime detection of vulnerabilities in an application software container that is configured to execute an application. The method includes detecting the application stored in an image of the application software container; identifying, based on at least one predetermined potential location for the application, configuration data stored in the application software container for the application; determining, based on the identified configuration data, at least one intended behavior of the application when executed in the application software container; monitoring execution of the application software container, wherein the monitoring includes comparing the execution of the application software container to the at least one intended behavior; detecting an unauthorized action by the application software container when the execution of the application software container is anomalous as compared to the at least one intended behavior; and generating a detection event when the unauthorized action by the software container is detected.

20 Claims, 7 Drawing Sheets

Related U.S. Application Data (60) Provisional application No. 62/505,320, filed on May 12, 2017, provisional application No. 62/235,644, filed on Oct. 1, 2015, provisional application No. 62/235,641, filed on Oct. 1, 2015.

(51) Int. Cl.
*G06F 9/455* (2018.01)
*G06F 9/445* (2018.01)

(52) U.S. Cl.
CPC .. *G06F 21/566* (2013.01); *G06F 2009/45587* (2013.01); *G06F 2221/033* (2013.01)

(56) References Cited

U.S. PATENT DOCUMENTS

| | | | |
|---|---|---|---|
| 6,523,027 B1 | 2/2003 | Underwood | |
| 6,704,873 B1 | 3/2004 | Underwood | |
| 6,732,162 B1 | 5/2004 | Wood et al. | |
| 7,100,195 B1 | 8/2006 | Underwood | |
| 7,103,740 B1* | 9/2006 | Colgrove | G06F 3/0605 |
| | | | 707/999.202 |
| 7,577,848 B2 | 8/2009 | Schwartz et al. | |
| 7,596,227 B2 | 9/2009 | Illowsky et al. | |
| 7,640,235 B2 | 12/2009 | Shulman et al. | |
| 7,698,741 B2 | 4/2010 | Marinescu et al. | |
| 7,743,420 B2 | 6/2010 | Shulman et al. | |
| 7,752,662 B2 | 7/2010 | Shulman et al. | |
| 7,752,669 B2 | 7/2010 | Palliyil et al. | |
| 7,779,468 B1 | 8/2010 | Magdych et al. | |
| 7,861,303 B2 | 12/2010 | Kouznetsov et al. | |
| 7,882,542 B2* | 2/2011 | Neystadt | H04L 63/308 |
| | | | 726/11 |
| 8,024,804 B2 | 9/2011 | Shulman et al. | |
| 8,051,484 B2 | 11/2011 | Shulman et al. | |
| 8,056,141 B2 | 11/2011 | Shulman et al. | |
| 8,108,933 B2 | 1/2012 | Mahaffey | |
| 8,135,948 B2 | 3/2012 | Shulman et al. | |
| 8,181,246 B2 | 5/2012 | Shulman et al. | |
| 8,302,192 B1 | 10/2012 | Cnudde et al. | |
| 8,316,237 B1 | 11/2012 | Felsher et al. | |
| 8,499,150 B1 | 7/2013 | Nachenberg | |
| 8,510,571 B1 | 8/2013 | Chang et al. | |
| 8,621,613 B1 | 12/2013 | McClintock et al. | |
| 8,639,625 B1 | 1/2014 | Ginter et al. | |
| 8,677,472 B1* | 3/2014 | Dotan | H04L 67/22 |
| | | | 726/12 |
| 8,756,683 B2 | 6/2014 | Manion et al. | |
| 8,806,625 B1 | 8/2014 | Berger | |
| 8,966,629 B2 | 2/2015 | Sallam | |
| 9,003,141 B2 | 4/2015 | Nielsen et al. | |
| 9,098,333 B1 | 8/2015 | Obrecht et al. | |
| 9,203,862 B1* | 12/2015 | Kashyap | H04L 63/145 |
| 9,223,966 B1* | 12/2015 | Satish | G06F 21/53 |
| 9,256,467 B1 | 2/2016 | Singh et al. | |
| 9,355,248 B1* | 5/2016 | Wiest | G06F 21/55 |
| 9,401,922 B1* | 7/2016 | Walters | H04L 63/14 |
| 9,594,590 B2 | 3/2017 | Hsu | |
| 9,904,781 B2 | 2/2018 | Martini et al. | |
| 9,928,379 B1 | 3/2018 | Hoffer | |
| 10,223,534 B2 | 3/2019 | Stopel et al. | |
| 10,333,967 B2 | 6/2019 | Litva et al. | |
| 2001/0007131 A1 | 7/2001 | Galasso et al. | |
| 2003/0014629 A1 | 1/2003 | Zuccherato | |
| 2003/0079145 A1 | 4/2003 | Kouznetsov et al. | |
| 2003/0120593 A1 | 6/2003 | Bansal et al. | |
| 2003/0229801 A1 | 12/2003 | Kouznetsov et al. | |
| 2003/0233566 A1 | 12/2003 | Kouznetsov et al. | |
| 2003/0233574 A1 | 12/2003 | Kouznetsov et al. | |
| 2004/0133793 A1 | 7/2004 | Ginter et al. | |
| 2005/0120054 A1 | 6/2005 | Shulman et al. | |
| 2005/0177715 A1 | 8/2005 | Somin et al. | |
| 2006/0075494 A1* | 4/2006 | Bertman | G06F 21/552 |
| | | | 726/22 |
| 2006/0230451 A1 | 10/2006 | Kramer et al. | |
| 2006/0277606 A1 | 12/2006 | Yunus et al. | |
| 2006/0282664 A1 | 12/2006 | Zhao | |
| 2006/0288420 A1 | 12/2006 | Mantripragada et al. | |
| 2007/0112714 A1 | 5/2007 | Fairweather | |
| 2007/0130621 A1 | 6/2007 | Marinescu et al. | |
| 2007/0136282 A1 | 6/2007 | Takashima | |
| 2007/0174630 A1 | 7/2007 | Shannon et al. | |
| 2007/0240218 A1 | 10/2007 | Tuvell et al. | |
| 2007/0240220 A1 | 10/2007 | Tuvell et al. | |
| 2007/0240221 A1 | 10/2007 | Tuvell et al. | |
| 2007/0240222 A1 | 10/2007 | Tuvell et al. | |
| 2008/0086773 A1 | 4/2008 | Tuvell et al. | |
| 2008/0134177 A1 | 6/2008 | Fitzgerald et al. | |
| 2008/0168135 A1 | 7/2008 | Redlich et al. | |
| 2008/0177994 A1 | 7/2008 | Mayer | |
| 2008/0196104 A1 | 8/2008 | Tuvell et al. | |
| 2008/0256636 A1* | 10/2008 | Gassoway | G06F 21/565 |
| | | | 726/24 |
| 2009/0144823 A1 | 6/2009 | Lamastra et al. | |
| 2009/0158432 A1 | 6/2009 | Zheng et al. | |
| 2009/0217260 A1 | 8/2009 | Gebhart et al. | |
| 2009/0319796 A1 | 12/2009 | Kim et al. | |
| 2010/0011029 A1 | 1/2010 | Niemela | |
| 2011/0116637 A1 | 5/2011 | Schiefelbein | |
| 2011/0179484 A1 | 7/2011 | Tuvell et al. | |
| 2011/0258701 A1* | 10/2011 | Cruz | G06F 21/554 |
| | | | 726/23 |
| 2011/0314542 A1 | 12/2011 | Viswanathan et al. | |
| 2011/0314548 A1 | 12/2011 | Yoo | |
| 2011/0321139 A1 | 12/2011 | Jayaraman et al. | |
| 2012/0008529 A1 | 1/2012 | Averbuch et al. | |
| 2012/0023584 A1 | 1/2012 | Yoo | |
| 2012/0036572 A1 | 2/2012 | Yoo | |
| 2012/0042375 A1 | 2/2012 | Yoo | |
| 2012/0117203 A1 | 5/2012 | Taylor et al. | |
| 2012/0222123 A1* | 8/2012 | Williams | G06F 21/577 |
| | | | 726/25 |
| 2013/0073388 A1 | 3/2013 | Heath | |
| 2014/0059226 A1 | 2/2014 | Messerli et al. | |
| 2014/0173761 A1 | 6/2014 | Hong et al. | |
| 2014/0181894 A1 | 6/2014 | Bokern et al. | |
| 2014/0237550 A1 | 8/2014 | Anderson et al. | |
| 2014/0283071 A1 | 9/2014 | Spikes | |
| 2014/0337234 A1 | 11/2014 | Tang et al. | |
| 2015/0156183 A1 | 6/2015 | Beyer et al. | |
| 2015/0178497 A1 | 6/2015 | Lukacs et al. | |
| 2015/0220735 A1* | 8/2015 | Paithane | G06F 21/53 |
| | | | 726/23 |
| 2015/0271139 A1 | 9/2015 | Lukacs et al. | |
| 2015/0332043 A1 | 11/2015 | Russello | |
| 2015/0372980 A1 | 12/2015 | Eyada | |
| 2015/0379287 A1 | 12/2015 | Mathur et al. | |
| 2016/0323315 A1 | 11/2016 | Hathaway et al. | |
| 2017/0004302 A1 | 1/2017 | Derbeko et al. | |
| 2017/0063557 A1 | 3/2017 | Chalmandrier-Perna | |
| 2017/0068676 A1 | 3/2017 | Jayachandran et al. | |
| 2017/0177877 A1 | 6/2017 | Suarez et al. | |
| 2017/0244748 A1* | 8/2017 | Krause | H04L 63/20 |

OTHER PUBLICATIONS

Cziva, et al., "Container-based Network Function Virtualization for Software-Defined Networks," 2015 IEEE Symposium on Computers and Communication (ISCC), pp. 415-420, Scotland.

Dhakchianandan, et al., "Memory Efficacious Pattern Matching Intrusion Detection System", 2013 International Conference on Recent Trends in Information Technology (ICRTIT), pp. 652-656, Anna University, Chennai, India.

Guenane, et al, "Autonomous Architecture for Managing Firewalling Cloud-Based Service," 2014 International Conference and Workshop on the Network of the Future (NOF), Paris, France, pp. 1-5.

Rehak, et al., "Adaptive Multiagent System for Network Traffic Monitoring," IEEE Intelligent Systems, vol. 24, Issue: 3, 2009, Czechia, pp. 17-25.

(56) References Cited

OTHER PUBLICATIONS

Shouman, et al., "Surviving Cyber Warfare With a Hybrid Multiagent-based Intrusion Prevention System," IEEE Potentials, vol. 29, Issue: 1, 2010, pp. 32-40.

Song, et al., "A Control Theoretical Approach for Flow Control to Mitigate Bandwidth Attacks," 2006 IEEE Information Assurance Workshop, West Point, NY, pp. 348-360.

Van Niekerk, et al., "Cloud-Based Security Mechanisms for Critical Information Infrastructure Protection," 2013 International Conference on Adaptive Science and Technology, South Africa, pp. 1-4.

Wang, et al., "Transport-Aware IP Routers: A Built-in Protection Mechanism to Counter DDoS Attacks," IEEE Transactions on Parallel and Distributed Systems, vol. 14, Issue: 9, pp. 873-884, Sep. 2003.

Zhauniarovich, et al., "Moses: Supporting and Enforcing Security Profiles on Smartphones," IEEE Transactions on Dependable and Secure Computing, vol. 11, Issue: 3, pp. 211-223, 2014.

Kovatsch, et. al., "A RESTful Runtime Container for Scriptable Internet of Things Applications", 3rd IEEE International Conference on the Internet of Things, Oct. 2012.

Mattetti, et. al., "Securing the Infrastructure and the Workloads of Linux Containers", IEEE Conference on Communications and Network Security (CNS), 2015.

Pan, et. al., Robust Container Code Recognition System, Fifth World Congress on Intelligent Control and Automation, 2004.

Azkia, et al., "Reconciling IHE-ATNA Profile with a posteriori Contextual Access and Usage Control Policy in Healthcare Environment", 2010 Sixth International Conference on Information Assurance and Security, 2010 IEEE, pp. 197-203, Cesson, Sevigne, France.

Skillen, et al., "Mobiflage: Deniable Storage Encryption for Mobile Devices," IEEE Transaction on Dependable and Secure Computing, vol. 11, No. 3, May-Jun. 2014, 2013 IEEE, pp. 224-237, Canada.

Cooper, et. al., "Internet X.509 Public Key Infrastructure Certificate and Certificate Revocation List (CRL) Profile", May 2008, pp. 151.

Housley, et. al., "Internet X 509 Public Key Infrastructure Certificate and Certificate Revocation List (CRL) Profile", Apr. 2002, pp. 259.

Schneier, Bruce., "Economics of Information Security and Privacy III", 2013, pp. 73-109.

Balazsi, et al., "Software System for Broadcasting and Monitoring Traffic Information", 2014 IEEE 12th International Symposium on Intelligent Systems and Informatics (SISY), 2014, pp. 39-42, Subotica, Serbia.

Jing, et al., "A Context-aware Disaster Response System Using Mobile Software Technologies and Collaborative Filtering Approach", 2014 IEEE 18th International Conference on Computer Supported Cooperative Work in Design, 2014, pp. 516-522, China.

\* cited by examiner

RUNTIME DETECTION AND MITIGATION OF VULNERABILITIES IN APPLICATION SOFTWARE CONTAINERS

CROSS-REFERENCE TO RELATED APPLICATIONS

This application claims the benefit of U.S. Provisional Application No. 62/505,320 filed on May 12, 2017. This patent application is also a continuation-in-part of U.S. patent application Ser. No. 15/278,700 filed on Sep. 28, 2016, now pending, which claims the benefit of U.S. Provisional Application No. 62/235,644 filed on Oct. 1, 2015, and from U.S. Provisional Application No. 62/235,641 filed on Oct. 1, 2015.

The contents of the above-referenced applications are hereby incorporated by reference.

TECHNICAL FIELD

The present disclosure generally relates to cybersecurity systems, and more particularly to detection of malicious code and activity in software containers.

BACKGROUND

A software container is an instance of a user-space running an application within the operating system (OS) of a host device (e.g., a server). Software containers enable operating-system-level virtualization in which the OS kernel allows the existence of multiple isolated software containers.

A software container (or a container) provides an executable environment with a complete filesystem. The filesystem may contain code, runtime, system tools, system libraries, and so on. That is, execution of a software container can be the same regardless of the underlying infrastructure. Docker is one of the popular existing platforms for creating, migrating, managing, and deploying software containers.

A software container, unlike a virtual machine, does not require or include a separate operating system. Rather, the container relies on the kernel's functionality and uses hardware resources (CPU, memory, I/O, network, etc.) and separate namespaces to isolate the application's view of the operating system. A software container can access the OS kernel's virtualization features either directly or indirectly. For example, Linux kernel can be accessed directly using the libcontainer library or indirectly using the libvirt service.

Figure 1:
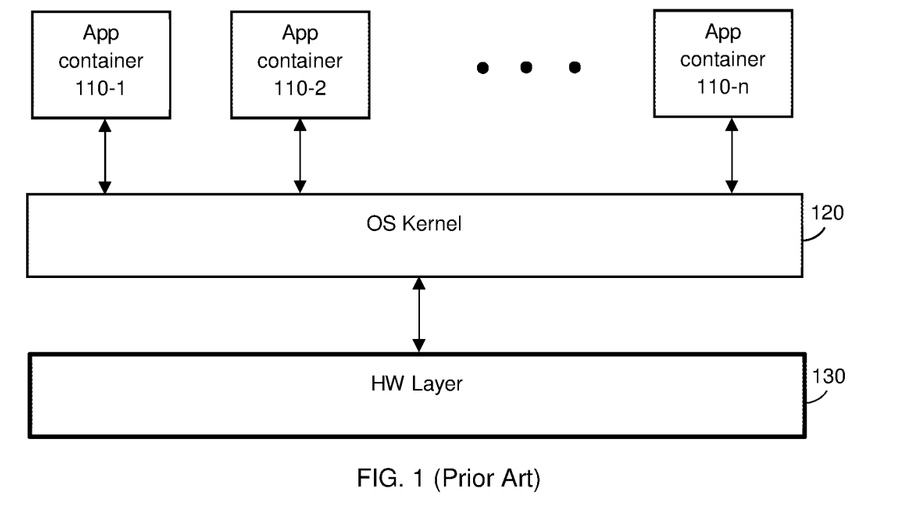
FIG. 1 is a diagram illustrating execution of a plurality of software containers.

As demonstrated in FIG. 1, a number of software containers (i.e., the app containers 110-1 through 110-n, hereinafter referred to individually as a container 110) can access and share the same OS kernel 120. However, each container 110 can be constrained to only use a defined amount of hardware resources (e.g., CPU, memory, etc.) in the underlying hardware (HW) layer 130. Thus, using software containers, hardware resources can be isolated, services can be restricted, and processes can be provisioned to have an almost completely private view of the operating system with their own process ID space, file system structure, and network interfaces.

Figure 2:
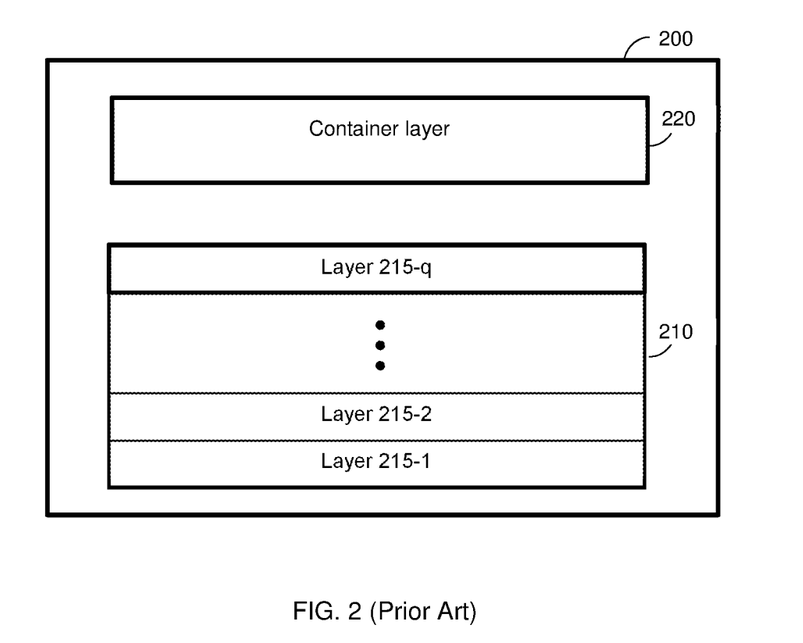
FIG. 2 is a diagram illustrating a structure of a software container.

FIG. 2 illustrates a typical structure of a software container 200. The software container 200 includes a base image 210 and a container layer 220. The base image 210 includes one or more image layers 215-1 through 215-q (hereinafter referred to individually as a layer 215 and collectively as layers 215, merely for simplicity purposes). The layers 215 are read-only layers that represent filesystem differences. That is, the layers 215 are stacked on top of each other to form a base for the root filesystem of the container 200. The layers 215 are read only, and each layer 215 is identified by a randomly generated identifier number of a checksum computed using a hash function.

The base image 210 (and its layers 215) can be shared across different software containers. Thus, only the container layer 220 differentiates between one software container and another. The container layer 220 is a readable and writable layer where all data written to the software container 200 are saved in the container layer 220. When the software container 200 is deleted, the writable container layer 220 is also deleted, and the base image 210 remains unchanged. As such, the multiple software containers including the software container 200 can share access to the same base image 210, each of which has its own data state. In the example demonstrated in FIG. 2, the software container 200 is a Docker container (e.g., compliant with the Docker platform).

The popularity of software containers has been increased due to the easy integration with cloud-computing platform (e.g., Amazon® Web Services, Google® Cloud Platform, Microsoft® Azure, etc.). On such platforms, service providers can offer operating systems to run services and applications. With that said, the increasing reliance on software containers increases the need for secured execution.

When a software application (application) is deployed into a container, its intended behavior is more declarative than in a traditional (non-container) model. For example, the container runtime exposes certain information about a system, such as the storage volumes mounted to the system, the networks that are linked to the system, and the processes which are instructed to execute within the system. However, application specific information, namely information about how a particular application is configured to operate, is not accessible through these common interfaces. These configuration attributes are set within the application's configuration file. The configuration file may be located inside of a container, and is thus not exposed through the container layer's interfaces. This limits the ability of security tools to adjust, at runtime, certain settings and implement security rules that may provide appropriate protection for the unique needs of the application.

As an example, a software container running a web server may be configured to map port 8080 on the host to port 80 on the container. When ports are exposed in this manner, security tools can monitor a list of exposed ports in order to ensure that such a list is consistent with what is specified within an application when it is launched. However, other application specific runtime data, such as ports that are open but not mapped, file paths that the application (e.g., web server) writes to and reads from, and system calls required by the application, are not accessible to security tools because the container layer does not provide a consistent interface from which to describe and retrieve them. This introduces vulnerabilities that can be exploited.

As an example, a user may create an Apache image (a web server application) with a default port set within the configuration file to 80. The user may run the image and map a random ephemeral port on the host to 80. Information about this mapping is available through the container layer, allowing a security tool to retrieve the information and build a rule set to monitor the port.

However, if the container becomes compromised and an attacker creates a new socket on a different port on the container, data can be harvested through the new port from other containers that are located on the same network.

Without proper access to the configuration of the application itself, the security tool cannot reliably determine whether the new port is anomalous and should be flagged, or if it is to be considered normal behavior of the application and allowed.

Another cause for potential vulnerabilities in containers is that images, such as those for a web server-based container, are often composed using common software that is in widespread use. As such, configuration parsing knowledge can be developed centrally and applied to multiple customer installations. Containers always explicitly declare the ports that are exposed on the host network and these declarations can be discovered via container engine APIs. Thus, many such images are susceptible to attacks.

It would therefore be therefore advantageous to provide a solution that would secure the execution of software containers.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for runtime detection of vulnerabilities in an application software container. The application software container is configured to execute an application. The method comprises: detecting the application stored in an image of the application software container; identifying, based on at least one predetermined potential location for the application, configuration data stored in the application software container for the application; determining, based on the identified configuration data, at least one intended behavior of the application when executed in the application software container; monitoring execution of the application software container, wherein the monitoring includes comparing the execution of the application software container to the at least one intended behavior; detecting an unauthorized action by the application software container when the execution of the application software container is anomalous as compared to the at least one intended behavior; and generating a detection event when the unauthorized action by the software container is detected.

Certain embodiments disclosed herein also include a non-transitory computer readable medium having stored thereon causing a processing circuitry to execute a process, the process comprising: detecting an application stored in an image of an application software container; identifying, based on at least one predetermined potential location for the application, configuration data stored in the application software container for the application; determining, based on the identified configuration data, at least one intended behavior of the application when executed in the application software container; monitoring execution of the application software container, wherein the monitoring includes comparing the execution of the application software container to the at least one intended behavior; detecting an unauthorized action by the application software container when the execution of the application software container is anomalous as compared to the at least one intended behavior; and generating a detection event when the unauthorized action by the software container is detected.

Certain embodiments disclosed herein also include a system for runtime detection of vulnerabilities in an application software container. The application software container is configured to execute an application. The system comprises: a processing circuitry; and a memory, the memory containing instructions that, when executed by the processing circuitry, configure the system to: detecting the application stored in an image of the application software container; identifying, based on at least one predetermined potential location for the application, configuration data stored in the application software container for the application; determining, based on the identified configuration data, at least one intended behavior of the application when executed in the application software container; monitoring execution of the application software container, wherein the monitoring includes comparing the execution of the application software container to the at least one intended behavior; detecting an unauthorized action by the application software container when the execution of the application software container is anomalous as compared to the at least one intended behavior; and generating a detection event when the unauthorized action by the software container is detected.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for detecting and mitigating vulnerabilities in application software containers at runtime. Execution of an application software container is monitored and compared to intended behaviors for the application software container. The intended behaviors may be determined based on a configuration file for the new application software container. Any anomalous behavior in the execution of the application software container is identified as an unauthorized action. When an unauthorized action is identified, a detection event is generated and mitigation actions may be executed.

The detected vulnerabilities may include unknown vulnerabilities. Unknown vulnerabilities are unauthorized actions performed by a software container at runtime. In an embodiment, detection of vulnerabilities is performed in a quarantined execution environment, thereby protecting the host device from being harmed by any unauthorized and potentially malicious action performed by a software container.

A software container provides an executable environment with a complete filesystem. A software container may include a micro-service, a Docker container, a light virtual machine, and the like. An application software container is a software container that is configured to execute a specific application at runtime.

Figure 3:
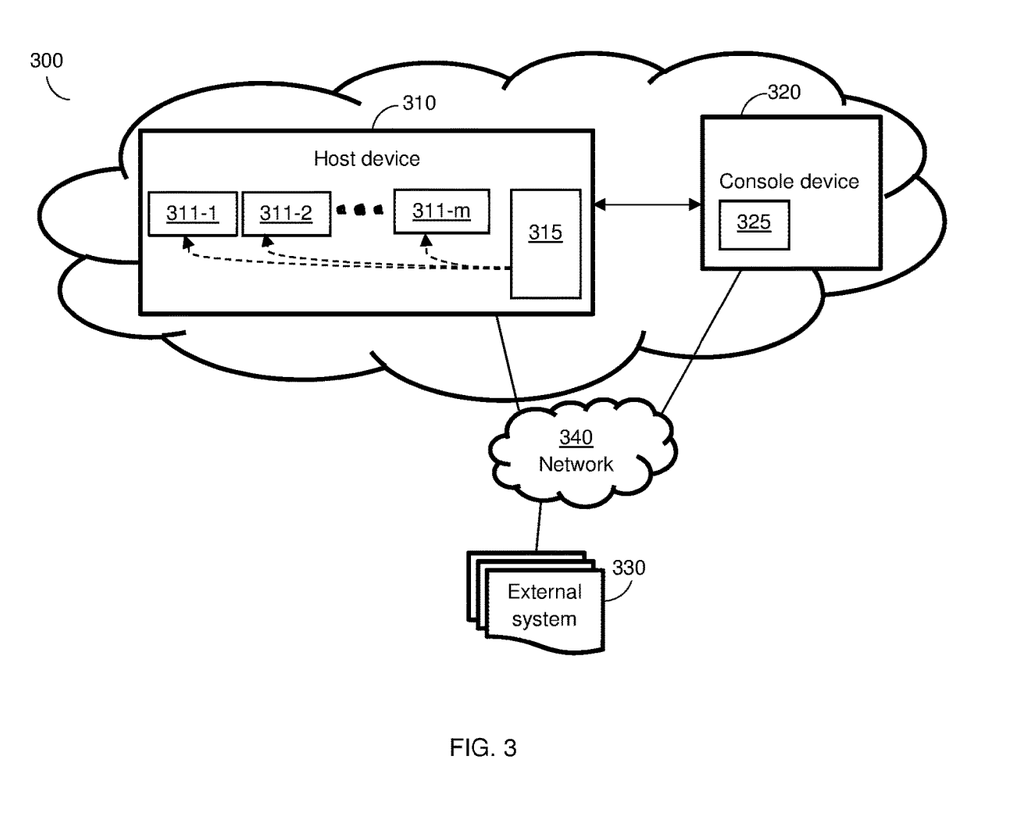
FIG. 3 is a network diagram utilized to describe the various disclosed embodiments.

FIG. 3 is an example network diagram 300 utilized to describe the various disclosed embodiments. A host device 310 is communicatively connected to a console device 320. Each of the devices 310 and 320 can be realized as a physical machine, a virtual machine, or a cloud-computing infrastructure (IaaS). Examples cloud-computing infrastructures include, but are not limited to, Amazon Web Services (AWS), Cisco® Metapod, Microsoft Azure®, Google® Compute Engine (GCE), Joyent®, and the like.

The devices 310 and 320 may be deployed in a datacenter, a cloud computing platform (e.g., a public cloud, a private cloud, or a hybrid cloud), on-premises of an organization, or in a combination thereof. It should be noted that the devices 310 and 320 can be deployed in different geographic locations.

The host device 310 is configured to host and execute a plurality of application (APP) software containers 311-1 through 311-m, where 'm' is an integer equal to or greater than 1 (collectively referred to hereinafter as APP containers 311 or individually as an APP container 311, merely for simplicity purposes). Each APP container 311 is a software container configured to execute a specific application.

According to the disclosed embodiments, the host device 310 is configured to host and execute a detector container 315. The detector container 315 is a software container designed to detect vulnerabilities in any of the APP containers 311. The operation of the detector container 315 for detecting vulnerabilities will be discussed in more detail herein below.

In an embodiment, the detector container 315 is configured to intercept any communication into or out of each APP container 311 during runtime of the APP container 311. To this end, the detector container 315 may act as a proxy to the APP container 311. For example, in a Docker architecture, the detector container 315 may proxy any communication between the client and daemon programs of the APP container 311. The intercepted communications may include, for example, system calls, access to a filesystem, access to a virtual machine hosting the APP container, access to a communication port, inbound and outbound network traffic, and so on. Each intercepted communication is analyzed to detect known and unknown vulnerabilities at runtime.

In an optional deployment, the console device 320 also interfaces with one or more external systems 330 through the network 340. Examples for such external systems 330 may include, but are not limited to, an active directory of an origination to retrieve user permissions, access control systems (e.g., Docker Swarm, and Kubernetes management plane), SIEM systems to report on detected vulnerabilities, audit and compliance systems, and the like.

In an embodiment, the console device 320 is configured to host and execute at least one console container 325. The console container 325 is a software container that interfaces with the detector container 315. Specifically, the console container 325 is configured to receive detection events on detected vulnerabilities from the detector container 315 and to report such events to a SIEM system or to a system administrator. In an embodiment, the events may be displayed on a GUI rendered by the console container 325 or on a GUI connected to the console device 320.

The network 340 may be the Internet, the world-wide-web (WWW), a local area network (LAN), a wide area network (WAN), a metro area network (MAN), and the like. It should be noted that the connection between the host device 310 and the console device 320 can be facilitated over a network, such as the network 340.

Detection of unknown vulnerabilities is performed on each APP container 311 when the APP container 311 is executed. To this end, the detector container 315 is configured to monitor system calls indicative of instantiation, running, or both, of a new APP container (e.g., the container 311-2). Based on the monitoring, anomalous behavior may be identified. The anomalous behavior may include, for example performing unauthorized actions.

In an embodiment, the monitoring includes comparing actions performed by the APP container 311 during execution with intended behaviors of the respective APP container 311. To this end, the monitoring may include intercepting any communications into or out of the APP container 311. The intended behaviors for an APP container 311 may be determined based on a configuration file of the APP container 311. When an action performed during execution of the APP container 311 deviates from one or more of the intended behaviors for the APP container 311, an anomaly has occurred and an unauthorized action is identified.

In an embodiment, the deviations from intended behaviors may include unauthorized actions as defined in a predetermined list of unauthorized actions for the application executed by the APP container 311. The list may be dynamically updated. Such unauthorized actions may include, but are not limited to, accessing a virtual machine, system calling an OS kernel, reading or writing from the filesystem, accessing another software container (e.g., another one of the APP containers 311), opening a connection port, running a process, accessing an external network address (e.g., a URL or IP address), and so on. As a non-limiting example, an attempt to access the usr/bin library by the APP container 311 may be determined as an unauthorized action. As another embodiment, accessing a URL associated with an unreportable website may be determined as an unauthorized action. As yet another example, opening a port designated as port 22 would be determined as an unauthorized action.

Upon detection of an unauthorized action indicating a vulnerability in an APP container 311, the detector container 315 is configured to generate and report a detection event to the console device 320. Such an event may include a container identifier of the APP container 311, a type of the detected vulnerability, an abnormal behavior, a combination thereof, and so on. In an embodiment, one or more mitigation actions can be executed when a detection event has been generated. Such a mitigation action may include, for example, halting the operation of the APP container, quarantining the APP container or the infected file, and so on. As mentioned above, the console device 320, via the console container 325, may cause the display of the detection event, of a report, or both, to an external system 335 such as a SEIM device.

In an embodiment, the monitoring may also include quarantining an APP container 311 by migrating the APP container 311 into a quarantined execution environment. The execution of the APP container 311 in the quarantined execution environment is monitored to detect any unauthorized actions performed by the APP container 311. Migration of APP containers during quarantined execution is described further with respect to FIGS. 4 and 7.

Figure 4:
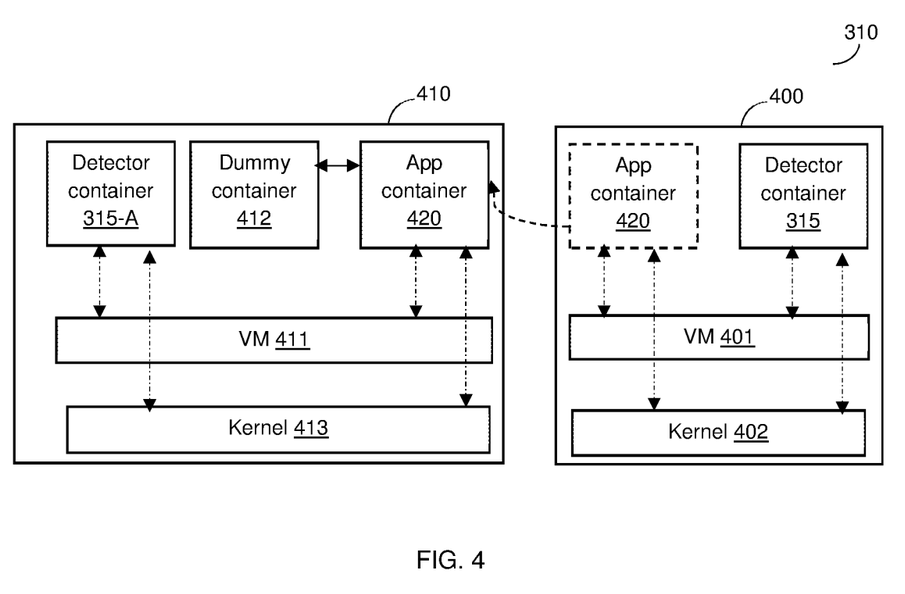
FIG. 4 is a diagram illustrating safe and quarantined execution environments for detecting unknown vulnerabilities according to an embodiment.

FIG. 4 shows an example host device 310 with a first safe execution environment 400 and a second quarantined execution environment 410. The safe execution environment 400 is configured to host and run the detector container 315 in a virtual machine (VM) 401 over an OS Kernel 402. The quarantined execution environment 410 is instantiated and created by the detector container 315.

The quarantined execution environment 410 includes a virtual machine 411 and a dummy container 412 both executed over an OS kernel 413. The dummy container 412 is a software container designed to mitigate any attempt to infect other containers executed in the same environment with a malicious code generated by an APP container 420 (e.g., one of the APP containers 311, FIG. 3). Attempts by the APP container 420 to interact with other containers while in the quarantined execution environment 410 result in interacting with the dummy container 412, thereby mitigating any harm from such interactions. In an embodiment, the quarantined execution environment 410 also includes an instance 315-A of the detector container 315 that is utilized to detect any vulnerability through the operation of the APP container 420 in the quarantined execution environment 410.

Upon detection of a new instance of the APP container 420 in the safe execution environment 400, the detector container 315 may be configured to migrate the APP container 420 to the quarantined execution environment 410. Alternatively, the APP container 420 may be monitored when in the safe environment 400 and migrated to the quarantined environment 410 when an unauthorized action is performed in the safe environment 400. In an embodiment, the migration includes exporting the APP container 420 together with all of its contents and metadata to the quarantined execution environment 410. The state of the APP container 420, including networking and storage states, are preserved during the migration.

In the quarantined execution environment 410, the detector container 315-A is configured to monitor the execution of the APP container 420. This includes intercepting any communications into and out of the APP container 420 and determining, based on the intercepted communications, if any unauthorized action is attempted to be performed by the APP container 420.

As noted above, the unauthorized actions may be included in a predefined list. With respect to the APP container 420 executing in the quarantined environment 410, the unauthorized actions may include, but are not limited to, accessing the VM 411, system calling the OS kernel 413, accessing the dummy container 412, reading or writing from the filesystem (not shown), opening a connection port (not shown), running a process, accessing an external network address (e.g., a URL or IP address), and so on.

Upon detection of an unauthorized action by the APP container 420, the detector container 315-A is configured to generate a detection event. In addition, one or more mitigation actions can be performed. Such mitigation actions may include, but are not limited to, terminating the execution of the APP container 420, terminating a specific malicious process executed by the APP container 420 that causes the vulnerability, blocking communications between the APP container 420 and resources external to the APP container 420, sending an alert indicating the detection event (e.g., to the console device 320, FIG. 3), and so on.

If should be appreciated that detecting unknown vulnerabilities in the quarantined execution environment 410 allows for stopping the propagation of, for example, malware by a malicious APP container. Such attempts to infect other containers executed in the same environment with a malicious code will be trapped by the dummy container 412. When the APP container 420 has executed securely for sufficient time, it may be safely migrated back to the safe execution environment 400

It should be further noted that the safe execution environment 400 is isolated from the quarantined execution environment 410. Thus, any malicious activity performed by the APP container 420 would not affect the safe execution environment 400. The safe execution environment 400 and the quarantined execution environment 410 may be created on the same host device or on different host devices.

In an embodiment, if no vulnerability is detected after execution of the APP container 420 in the quarantined execution environment 410 has occurred for a predetermined period of time, the APP container 420 is migrated back to the safe execution environment 400 for execution therein. When the APP container 420 is migrated back to the safe execution environment 400, the quarantined execution environment 410 is deleted. This process is controlled and orchestrated by the detector container 315-A.

Returning to FIG. 3, the embodiments disclosed herein are not limited to the specific architecture illustrated in FIG. 3, and other architectures may be used without departing from the scope of the disclosed embodiments. Specifically, the console container 325 may reside in the host device 310 without departing from the scope of the disclosure. Further, in an embodiment, there may be a plurality of detector containers 315 operating as described hereinabove and configured to either have one as a standby, to share loads between them, or to split the functions between them. In addition, other software containers or processes that handle the management and configuration of the APP containers 311, the detector container 315, the console container 325, or a combination thereof, may be hosted in the devices 310 and 320. Examples for such software containers or processes may include a Docker engine, a networking container, drivers, and so on.

Figure 5:
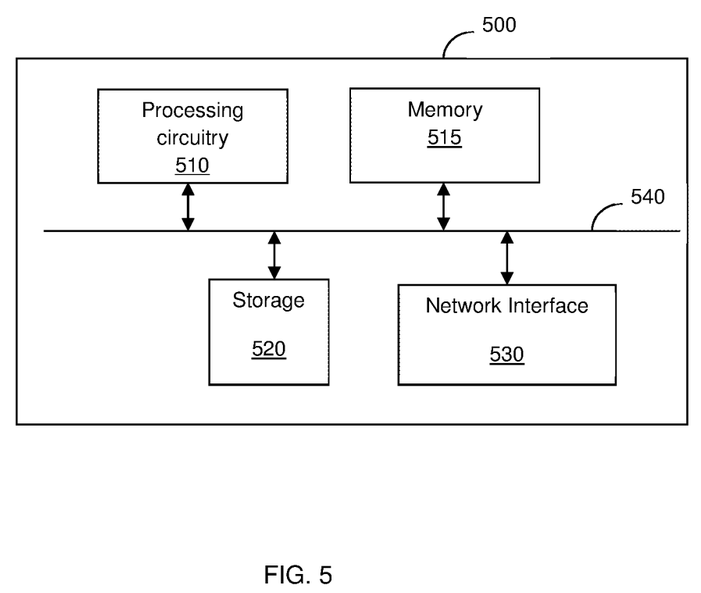
FIG. 5 is a schematic diagram of a hardware layer in a host device utilized to execute at least a detector container and a console container according to an embodiment.

It should be appreciated that each device 310 and 320 requires an underlying hardware layer to execute the OS, VMs, and software containers. An example block diagram of a hardware layer 500 is shown in FIG. 5. The hardware layer 500 includes a processing circuitry 510, a memory 515, a storage 520, and a network interface 530, all connected to a computer bus 540.

The processing circuitry 510 may be realized as one or more hardware logic components and circuits. For example, and without limitation, illustrative types of hardware logic components that can be used include Field Programmable Gate Arrays (FPGAs), Application-specific Integrated Circuits (ASICs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory 515 may be volatile, non-volatile, or a combination thereof. The storage may be magnetic storage, optical storage, and the like.

In one configuration, computer readable instructions to implement one or more embodiments disclosed herein may be stored in the storage 520. The storage 520 may also store other computer readable instructions to implement an operating system, an application program, and the like. Computer readable instructions may be loaded in the memory for execution by the processing circuitry 510.

In another embodiment, the storage 520, the memory 515, or both, are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 510 to perform the various functions described herein with respect to at least detection of vulnerabilities.

The network interface 530 allows communication with other external systems or host devices through a network (e.g., the network 340, FIG. 3). The network interface 530 may include a wired connection or a wireless connection. The network interface 530 may transmit communication media, receive communication media, or both. The computer bus 540 may be, for example, a PCIe bus.

Figure 6:
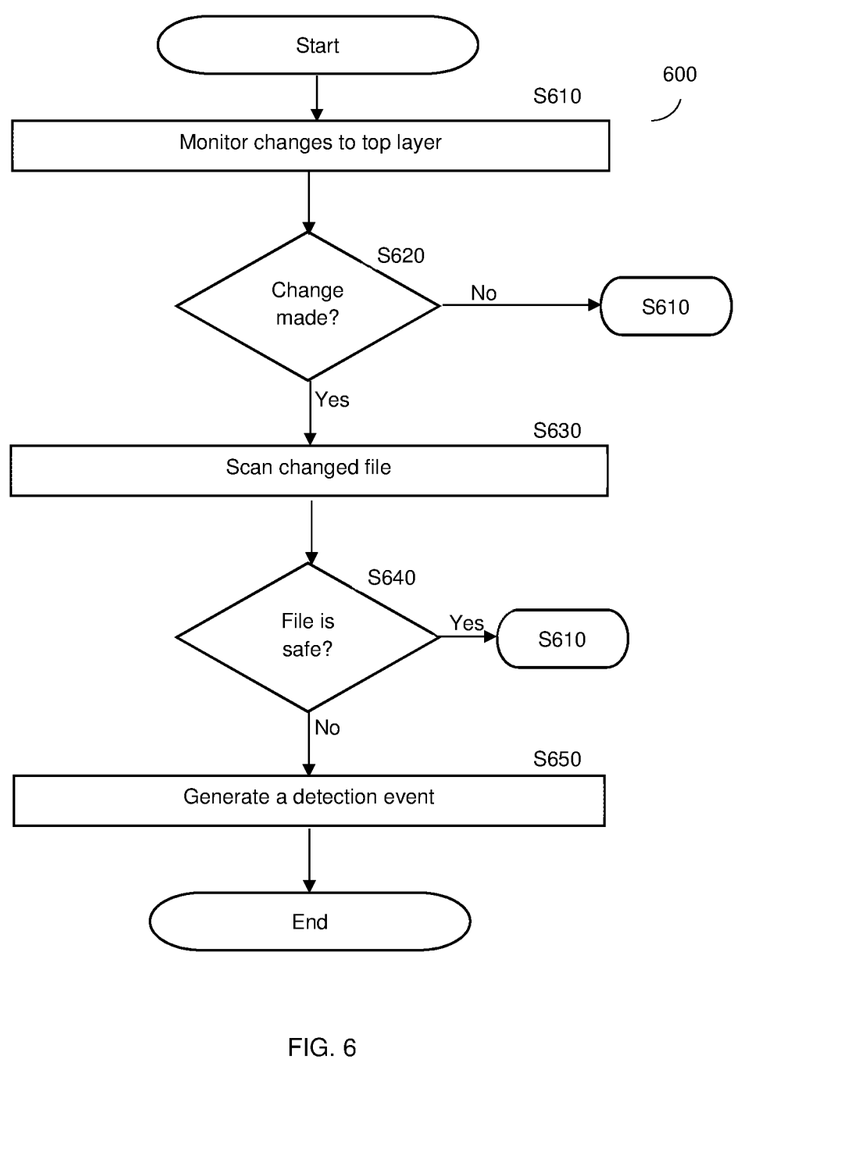
FIG. 6 is a flowchart illustrating a method for detecting known vulnerabilities in software containers at runtime according to an embodiment.

FIG. 6 is an example flowchart 600 illustrating a method for detecting known vulnerabilities in software containers at runtime according to an embodiment.

At S610, events triggered as a result of changes to the top (application) layer of an APP container (e.g., one of the APP containers 311, FIG. 3) are monitored. Such events include at least filesystem events and mounted volumes events.

At S620, it is determined if a change to the top layer, to a mounted volume map, or both, of a directory structure within the APP container has been made and, if so, execution continues with S630; otherwise execution returns to S610 to continue monitoring. As an example, such a change may include modifying a file or writing a new file in the top layer. A file may include a file, an object, a data block, and the like.

At S630, the changed (new or modified) file is scanned for known vulnerabilities. Such vulnerabilities may include previously known or newly discovered malware, or any modified version of previously known or newly discovered malware. Malware may include, for example, computer viruses, worms, Trojan horses, ransomware, spyware, adware, scareware, and other programs or processes executing malicious code.

In an embodiment, the scanning is performed based on intelligence information received from a console container (e.g., the console container 325). Such information includes definitions of known vulnerabilities such as, but not limited to, signatures of viruses, worms, spyware, or any other type of malware. Thus, in this embodiment, the file is inspected to determine if the file contains, for example, a signature of a known or newly discovered malware. In another embodiment, the scanning of the changed file is also based on one or more heuristics or behavior patterns of malicious programs. This allows for, for example, detection of known malware in any modified versions having different signatures but similar attack behavior.

At S640, it is checked if the changed file is safe, i.e., if no vulnerability was detected. If so, execution continues with S610; otherwise, execution continues with S650. It should be noted that the evaluation of newly modified or new files can be performed in the same manner described herein as long as the changes are made to the top layer of an APP container.

At S650, when the changed file is not safe, a detection event is generated and sent to the console container. The detection event may designate, for example, a container identified, a name of the infected file, a type of the detected vulnerability, and so on. In an embodiment, one or more mitigation actions can be executed in response to the detection event. The mitigation actions may include, but are not limited to, halting the operation of the app container, quarantining the APP container or the infected file, and the like.

Figure 7:
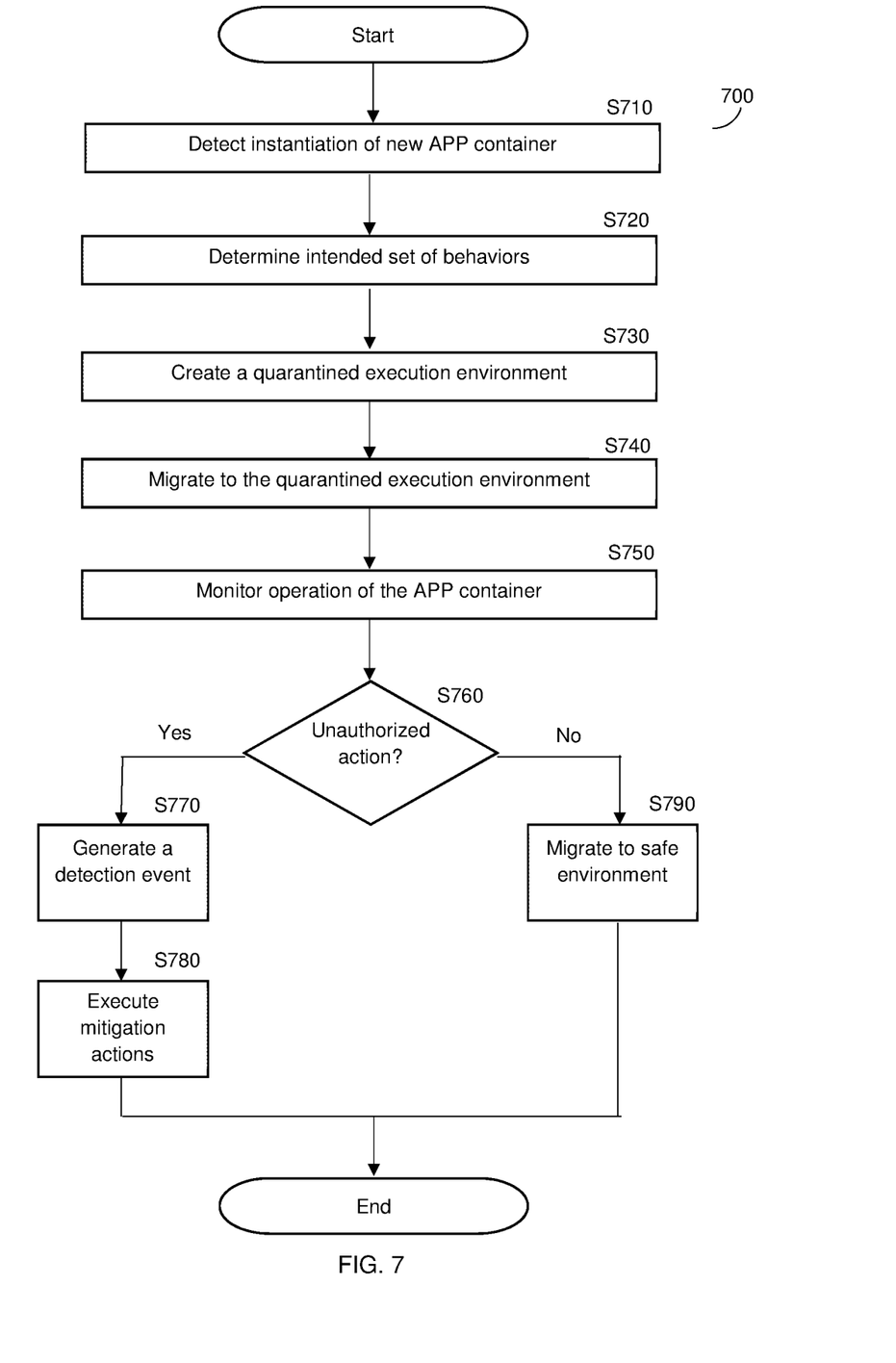
FIG. 7 is a flowchart illustrating a method for detecting and mitigating vulnerabilities in quarantined software containers at runtime according to an embodiment.

FIG. 7 is an example flowchart 700 illustrating a method for detecting and mitigating unknown vulnerabilities in quarantined software containers at runtime according to an embodiment.

At S710, instantiation of a new APP container (e.g., one of the APP containers 311, FIG. 3) in a first execution environment is detected. In an embodiment, the detection is performed by a detector container (e.g., the detector container 315, FIG. 3) configured to monitor all communications between APP containers executed in a first execution environment (e.g., the safe environment 400, FIG. 4). To this end, S710 may include monitoring communications between APP containers for system calls indicative of instantiation of a new APP container. Alternatively, S710 may instead include detecting an unauthorized action by an APP container in the first execution environment.

At S720, configuration data of each application of the APP container is accessed and analyzed to determine an intended set of behaviors for the application when deployed to a container. The intended set of behaviors may be, for example, included in settings of the respective configuration files. When these intended behaviors have been determined, the execution of the APP container is monitored. During monitoring, the intended set of behaviors is compared to the actual current state of the APP container to detect any anomalous behavior and, thus, to determine whether the execution is anomalous as compared to the intended behaviors. Any anomalous behavior may be identified as an unauthorized action.

In an embodiment, S720 further includes detecting the applications within an image of the APP container. The configuration files for the applications are found by looking in locations of the APP container based on each respective application. Specifically, an application knowledge database may include predetermined potential locations of configuration files within an APP container for each application. When an application is detected, the APP container is searched in the potential locations of configuration files in order to find the configuration file for the application.

At S730, a second quarantined execution environment (e.g., the quarantined execution environment 410, FIG. 4) is created. The second execution environment may be configured as described herein above with respect to FIG. 4. Creating the quarantined execution environment includes, for example, launching an OS Kernel, instantiating a VM, and instantiating a dummy container and a detector container to be executed over the VM. As noted above, the dummy container is also a software container.

At S740, the APP container is migrated to the quarantined execution environment for running therein.

At S750, the operation of the APP container in the quarantined execution environment is monitored to detect any attempts to perform any unauthorized actions. As noted above, an unauthorized action may include, but is not limited to, accessing the VM, system calling the OS kernel, accessing the dummy container, reading to or writing from the filesystem (not shown), opening a connection port (not shown), accessing an external network address (e.g., URL or IP address), running a process, and so on.

At S760, it is checked if an unauthorized action was detected. If so, execution continues with S770; otherwise, execution continues with S790. The check may be made, for example, after a predetermined period of time (e.g., 24 hours) has passed since migration of the APP container to the quarantined execution environment. Alternatively, execution may proceed with S770 in real-time when the unauthorized action is detected.

At S770, when an unauthorized action is detected, a detection event is generated. The detection event may designate a container identifier, a type of the detected vulnerability, a process causing the detected vulnerability, and so on.

At optional S780, one or more mitigation actions is executed. The mitigation actions may include, but are not limited to, terminating the execution of the APPEs container, terminating a process causing the unauthorized action, blocking communications between the APP container and at least one external resource (e.g., blocking the APP container from listening to one or more sockets), and sending an alert indicating the generated detection event (e.g., to the console container 325, FIG. 3).

As a non-limiting example, when a container listening on a socket that is not intended to be exposed as indicated by the application configuration file, an unauthorized action is detected and the listening by the container is blocked.

At optional S790, when an unauthorized action is not detected, the container is migrated back to a safe environment. In some implementations, the operation of a software container executed in a safe environment may be monitored. Upon detection of an attempt to perform an authorized action, such a software container may be migrated to the quarantined execution environment for further inspection.

Figure 8:
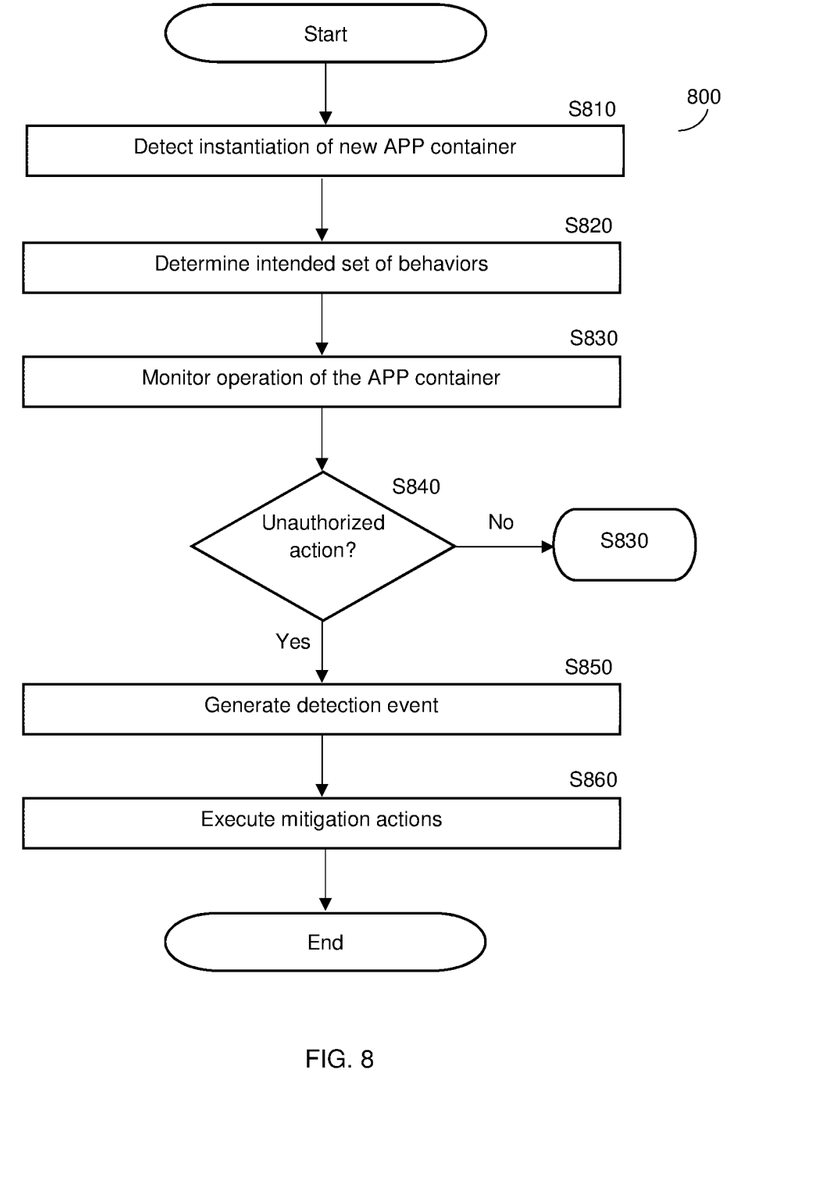
FIG. 8 is a flowchart illustrating a method for detecting and mitigating vulnerabilities in software containers at runtime according to another embodiment.

FIG. 8 is an example flowchart 800 illustrating a method for detecting and mitigating unknown vulnerabilities in software containers at runtime according to another embodiment.

At S810, instantiation of a new APP container (e.g., one of the APP containers 311, FIG. 3) is detected. In an embodiment, the detection is performed by a detector container (e.g., the detector container 315, FIG. 3) configured to monitor all communications between APP containers executed in the execution environment. To this end, S810 may include monitoring communications between APP containers for system calls indicative of instantiation of a new APP container.

At S820, configuration data of each application of the APP container is accessed and analyzed to determine an intended set of behaviors for the application when deployed to a container. The intended set of behaviors may be, for example, included in settings of the respective configuration files. When these intended behaviors have been determined, the execution of the APP container is monitored. During monitoring, the intended set of behaviors is compared to the actual current state of the APP container to detect any anomalous behavior and, thus, to determine whether the execution is anomalous as compared to the intended behaviors. Any anomalous behavior may be identified as an unauthorized action.

At S830, the operation of the APP container is monitored to detect any attempts to perform any unauthorized actions. As noted above, an unauthorized action may include, but is not limited to, accessing a VM, system calling an OS kernel, accessing another software container, reading to or writing from the filesystem (not shown), opening a connection port (not shown), accessing an external network address (e.g., URL or IP address), running a process, and so on.

At S840, it is checked if an unauthorized action was detected. If so, execution continues with S850; otherwise, execution continues with S830. In some implementations, if no unauthorized action is detected in a predetermined period of time (e.g., 24 hours), monitoring may terminate.

At S850, when an unauthorized action is detected, a detection event is generated. The detection event may designate a container identifier, a type of the detected vulnerability, a process causing the detected vulnerability, an unauthorized action, and so on.

At optional S860, one or more mitigation actions is executed. The mitigation actions may include, but are not limited to, terminating the execution of the APP container, terminating a process causing the unauthorized action, blocking communications between the APP container and at least one external resource (e.g., blocking the APP container from listening to one or more sockets), and sending an alert indicating the generated detection event (e.g., to the console container 325, FIG. 3).

It should be emphasized that the detection of the known and unknown vulnerabilities as described with respect to FIGS. 6 and 7 or FIGS. 6 and 8 can work in synergy to provide a comprehensive defense when executing software containers. For example, to mitigate an APT attack, both known and unknown vulnerabilities should be detected. That is, as an example, a hacker discovering a remote code execution vulnerability in one of the company's software containers pushes malicious code to be executed as part of the software container. The malicious code is designed to open a network connection with a remote server to download an agent. Such an attempt would be detected by the defender container quarantined execution environment.

If such an attempt was not detected, a malicious agent will be downloaded and stored to a storage of the host device. However, such a download will be detected as any changes to the filesystem are monitored and scanned. That is, the agent executable file will be scanned for malicious code. Further, any malicious activity performed by such agent will be monitored at runtime when the container (executing such an agent) is executed in the container quarantined execution environment.

As noted above, unlike virtual machines that function within a larger operating system, containers are limited in size, allowing for the possibility to definitively tie application specific configuration data to the runtime state of a container. To this end, in an embodiment, on a per application basis, reference is made to a knowledge base that discloses where the appropriate configuration files for a given application can be found. The desired attributes declared in these configuration files are compared with the actual state of each container in order to detect anomalies.

As a non-limiting example, an Apache webserver and its configuration files may be packaged into a new image of a new APP container, where the configuration file is set to listen to port 80. The new image is scanned and, based on an accessible knowledge base, it is determined that a specific application of the new APP container should only be listening to port 80 and no other ports. This is determined based on which file the Apache webserver uses for its configuration state. The file used by the Apache webserver is parsed in order to extract information about the specific listener configured therein. When the container is launched and there is a request to map port 8080 at the host layer to port 80 of the container, this linkage (mapping) is detected and the container is thereafter monitored to ensure that no other ports are later exposed.

Throughout the container's lifecycle, both which ports are mapped from the network to the container and which what ports are listening on the container (even if they are unmapped) are monitored. If a new port is detected on the container, even if it is not mapped to the connected network, the socket is deemed anomalous if it was not declared in the application's configuration file, and mitigation actions may be taken.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for runtime detection of vulnerabilities in an application software container, wherein the application software container is configured to execute an application, the method comprising:
    detecting the application stored in an image of the application software container;
    identifying, based on at least one predetermined potential location for the application, configuration data stored in the application software container for the application;
    determining, based on the identified configuration data, at least one intended behavior of the application when executed in the application software container and at least one first unauthorized action, wherein each first unauthorized action defines a deviation from the at least one intended behavior, wherein the at least one first unauthorized action is indicated in a predetermined list of unauthorized actions for the application executed by the application software container;
    monitoring execution of the application software container, wherein the monitoring includes comparing the execution of the application software container to the at least one intended behavior and to the at least one first unauthorized action;
    detecting a second unauthorized action by the application software container when the execution of the application software container is anomalous as compared to the at least one intended behavior, wherein the execution of the application software container is anomalous when one of the at least one first unauthorized action occurs during the execution of the application software container; and
    generating a detection event when the second unauthorized action by the software container is detected.

2. The method of claim 1, further comprising:
    executing at least one mitigation action when the second unauthorized action is detected.

3. The method of claim 2, wherein the at least one mitigation action includes at least one of: terminating the execution of the application software container, terminating a process causing the second unauthorized action, blocking communications between the application software container and at least one external resource, and sending an alert indicating the generated detection event.

4. The method of claim 1, further comprising:
    migrating the application software container from a first execution environment to a second execution environment, wherein the execution of the application software container is monitored in the second execution environment.

5. The method of claim 4, further comprising:
    migrating the application software container back to the first execution environment when the second unauthorized action is not detected within a predetermined period of time.

6. The method of claim 4, further comprising:
monitoring execution of the application software container in the first execution environment to detect a third unauthorized action by the application software container in the first execution environment, wherein the application software container is migrated to the second execution environment when the third unauthorized action by the application software container in the first execution environment is detected.

7. The method of claim 6, wherein the second execution environment includes a dummy container, wherein the third unauthorized action includes accessing the dummy container.

8. The method of claim 1, wherein the second unauthorized action is at least one of: accessing a virtual machine, calling an operating system kernel, accessing at least one other software container, reading from a filesystem, writing from a filesystem, opening a connection port, running a process, and accessing an external network address.

9. The method of claim 1, further comprising:
accessing a configuration file of the application software container, wherein the at least one intended behavior is determined based on the configuration file.

10. The method of claim 1, wherein the execution of the application software container includes at least one action performed by the application software container, wherein comparing the execution of the application software container to the at least one intended behavior further comprises comparing the at least one action performed by the application software container to the at least one first unauthorized action.

11. A non-transitory computer readable medium having stored thereon instructions for causing a processing circuitry to execute a process, the process comprising:
detecting an application stored in an image of an application software container;
identifying, based on at least one predetermined potential location for the application, configuration data stored in the application software container for the application;
determining, based on the identified configuration data, at least one intended behavior of the application when executed in the application software container and at least one first unauthorized action, wherein each first unauthorized action defines a deviation from the at least one intended behavior, wherein the at least one first unauthorized action is indicated in a predetermined list of unauthorized actions for the application executed by the application software container;
monitoring execution of the application software container, wherein the monitoring includes comparing the execution of the application software container to the at least one intended behavior and to the at least one first unauthorized action;
detecting a second unauthorized action by the application software container when the execution of the application software container is anomalous as compared to the at least one intended behavior, wherein the execution of the application software container is anomalous when one of the at least one first unauthorized action occurs during the execution of the application software container; and
generating a detection event when the second unauthorized action by the software container is detected.

12. A system for detecting unknown vulnerabilities in a software container at runtime, wherein the application software container is configured to execute an application, the system comprising:
a processing circuitry; and
a memory, the memory containing instructions that, when executed by the processing circuitry, configure the system to:
detect the application stored in an image of the application software container;
identify, based on at least one predetermined potential location for the application, configuration data stored in the application software container for the application;
determine, based on the identified configuration data, at least one intended behavior of the application when executed in the application software container and at least one first unauthorized action, wherein each first unauthorized action defines a deviation from the at least one intended behavior, wherein the at least one first unauthorized action is indicated in a predetermined list of unauthorized actions for the application executed by the application software container;
monitor execution of the application software container, wherein the monitoring includes comparing the execution of the application software container to the at least one intended behavior and to the at least one first unauthorized action;
detect a second unauthorized action by the application software container when the execution of the application software container is anomalous as compared to the at least one intended behavior, wherein the execution of the application software container is anomalous when one of the at least one first unauthorized action occurs during the execution of the application software container; and
generate a detection event when the second unauthorized action by the software container is detected.

13. The system of claim 12, wherein the system is further configured to:
execute at least one mitigation action when the second unauthorized action is detected.

14. The system of claim 13, wherein the at least one mitigation action includes at least one of: terminating the execution of the application software container, terminating a process causing the second unauthorized action, blocking communications between the application software container and at least one external resource, and sending an alert indicating the generated detection event.

15. The system of claim 12, wherein the system is further configured to:
migrate the application software container from a first execution environment to a second execution environment, wherein the execution of the application software container is monitored in the second execution environment.

16. The system of claim 15, wherein the system is further configured to:
migrate the application software container back to the first execution environment when the second unauthorized action is not detected within a predetermined period of time.

17. The system of claim 15, wherein the system is further configured to:
monitor execution of the application software container in the first execution environment to detect a third unauthorized action by the application software container in the first execution environment, wherein the application software container is migrated to the second execution environment when the third unauthorized action by the application software container in the first execution environment is detected.

18. The system of claim 17, wherein the second execution environment includes a dummy container, wherein the third unauthorized action includes accessing the dummy container.

19. The system of claim 12, wherein the second unauthorized action is at least one of: accessing a virtual machine, calling an operating system kernel, accessing at least one other software container, reading from a filesystem, writing from a filesystem, opening a connection port, running a process, and accessing an external network address.

20. The system of claim 12, wherein the system is further configured to:
   access a configuration file of the application software container, wherein the at least one intended behavior is determined based on the configuration file.

* * * * *